(12) United States Patent
Matsuo

(10) Patent No.: US 7,377,989 B2
(45) Date of Patent: May 27, 2008

(54) STEEL TUBE EXCELLENT IN EXFOLIATION RESISTANCE OF SCALE ON INNER SURFACE

(75) Inventor: Hiroshi Matsuo, Nishinomiya (JP)

(73) Assignee: Sumitomo Metal Industries, Ltd., Osaka (JP)

( * ) Notice: Subject to any disclaimer, the term of this patent is extended or adjusted under 35 U.S.C. 154(b) by 377 days.

(21) Appl. No.: 11/165,196

(22) Filed: Jun. 24, 2005

(65) Prior Publication Data

US 2006/0057414 A1 Mar. 16, 2006

(30) Foreign Application Priority Data

Sep. 15, 2004 (JP) .............................. 2004-267721
Mar. 30, 2005 (JP) .............................. 2005-097997

(51) Int. Cl.
C22C 38/18 (2006.01)
C22C 38/40 (2006.01)

(52) U.S. Cl. ........................................ 148/325; 148/327

(58) Field of Classification Search ........ 148/325–327, 148/909, 592–594; 29/90.7; 72/53

See application file for complete search history.

(56) References Cited

U.S. PATENT DOCUMENTS 4,086,104 A * 4/1978 Kinoshita et al. ............ 29/90.7

6,440,234 B1 * 8/2002 Amaya et al. .............. 148/325

FOREIGN PATENT DOCUMENTS

| EP | 1 016 734 A1 | | 7/2000 |
|---|---|---|---|
| JP | 53-104531 | * | 9/1978 |
| JP | 3-268940 | | 11/1991 |
| JP | 5-202448 | | 8/1993 |
| JP | 06-322489 | | 11/1994 |
| JP | 10-60538 | | 3/1998 |
| JP | 10-204530 | | 8/1998 |
| JP | 11-236651 | * | 8/1999 |
| JP | 2002-60964 | | 2/2002 |
| JP | 2002-285236 | | 10/2002 |

* cited by examiner

*Primary Examiner*—Deborah Yee
(74) *Attorney, Agent, or Firm*—Clark & Brody

(57) ABSTRACT

A steel tube excellent in exfoliation resistance of scale on its inner surface is provided. The steel tube includes 9 to 28% by mass of Cr and has a maximum height of profile (Rz) on the inner surface after cold working of 15 µm or more. Preferably ΔHv of the tube is 100 or more, wherein ΔHv is the difference in Vickers hardness between an inner surface layer and a thickness center part of the tube. The steel may desirably have a microstructure of ASTM austenite grain size No. 7. or more.

3 Claims, 2 Drawing Sheets

Fig..1

STEEL TUBE EXCELLENT IN EXFOLIATION RESISTANCE OF SCALE ON INNER SURFACE

FIELD OF THE INVENTION

The present invention relates to a steel tube having an inner surface layer excellent in the exfoliation resistance of scale.

PRIOR ART

In a heat exchanger tube made of stainless steel or other alloys, scale is generated due to oxidation by steam on the inner surface of the tube. The scale partially exfoliates due to the thermal shock caused by repetition of the start and stop process of the equipment such as a boiler. The exfoliated scale sometimes leads to obstruction in which causes overheating in the tube, which may lead to a bursting accident.

Preventing the growth of the scale is effective in solving problems accompanying the exfoliation of the scale. For that purpose, increasing the content of Cr, Si and Al in the tube material, refining of grains, and plastic working by shot peening (shot blasting) or the like are effectively adapted. Steam oxidation can be prevented by these measures.

The improvement in steam oxidation resistance by shot peening is proposed, for example, in Publication of Japanese Patent Application Hei 6-322489 and Publication of Japanese Patent Application 2002-285236. The effect of the plastic working by shot peening or the like is based on the following principle. When a tube, having an inner surface that has been subjected to plastic working by the use of steel balls or the like, contacts with high-temperature overheated steam, an extremely thin scale of Cr oxides with a low growth rate is uniformly generated on the tube surface. This scale has a good protective property and can be stably present for a long time, whereby the steam oxidation resistance is improved.

This plastic working of the inner surface of the tube has been extensively used since it can be carried out at a low cost compared with other methods. However, it is difficult to perfectly prevent the exfoliation of scale, which results from the thermal shock by the repeated stop and start process, even if this method is used, or even if the above-mentioned other measures are taken.

SUMARY OF THE INVENTION

An objective of the present invention is to provide a steel tube, excellent in the exfoliation resistance of scale; more specifically, a steel tube in which the exfoliation of scale on the inner surface does not take place even if it receives a thermal shock in a steam oxidizing atmosphere.

The present inventor found that it is important for the prevention of the exfoliation of scale, which results from the thermal shock by stopping and restarting of the process, not only to apply the plastic working such as shot peening to the tube inner surface after tube making work, but also to control the roughness of the working surface to a specified level or more. It was also confirmed that the exfoliation resistance of scale can be further enhanced by increasing the strain quantity of the worked inner surface layer; in other words, by making the inner surface layer of the tube harder than the center part of thickness of the tube and also grain-refining the microstructure of the tube material.

The present invention, based on the above knowledge, relates to the following steel tubes (1) to (3).

(1) A steel tube excellent in exfoliation resistance of scale on its inner surface, characterized by containing 9 to 28% by mass of Cr and having 15 μm or more of maximum height of profile (Rz) on the inner surface after cold working.

(2) A steel tube excellent in exfoliation resistance of scale on its inner surface, characterized by containing 9 to 28% by mass of Cr, and having 15 μm or more of maximum height of profile (Rz) on the inner surface after cold working, and 100 or more of ΔHv.

The ΔHv is a difference in Vickers hardness between the inner surface layer and the center part of the tube thickness.

(3) A steel tube excellent in exfoliation resistance of scale on its inner surface according to above (1) or (2), having a microstructure of ASTM austenite grain size No. 7 or more.

The cold working in above (1) and (2) is preferably the plastic working by shot peening.

DETAILED DESCRIPTION OF THE INVENTION

Figure 1:
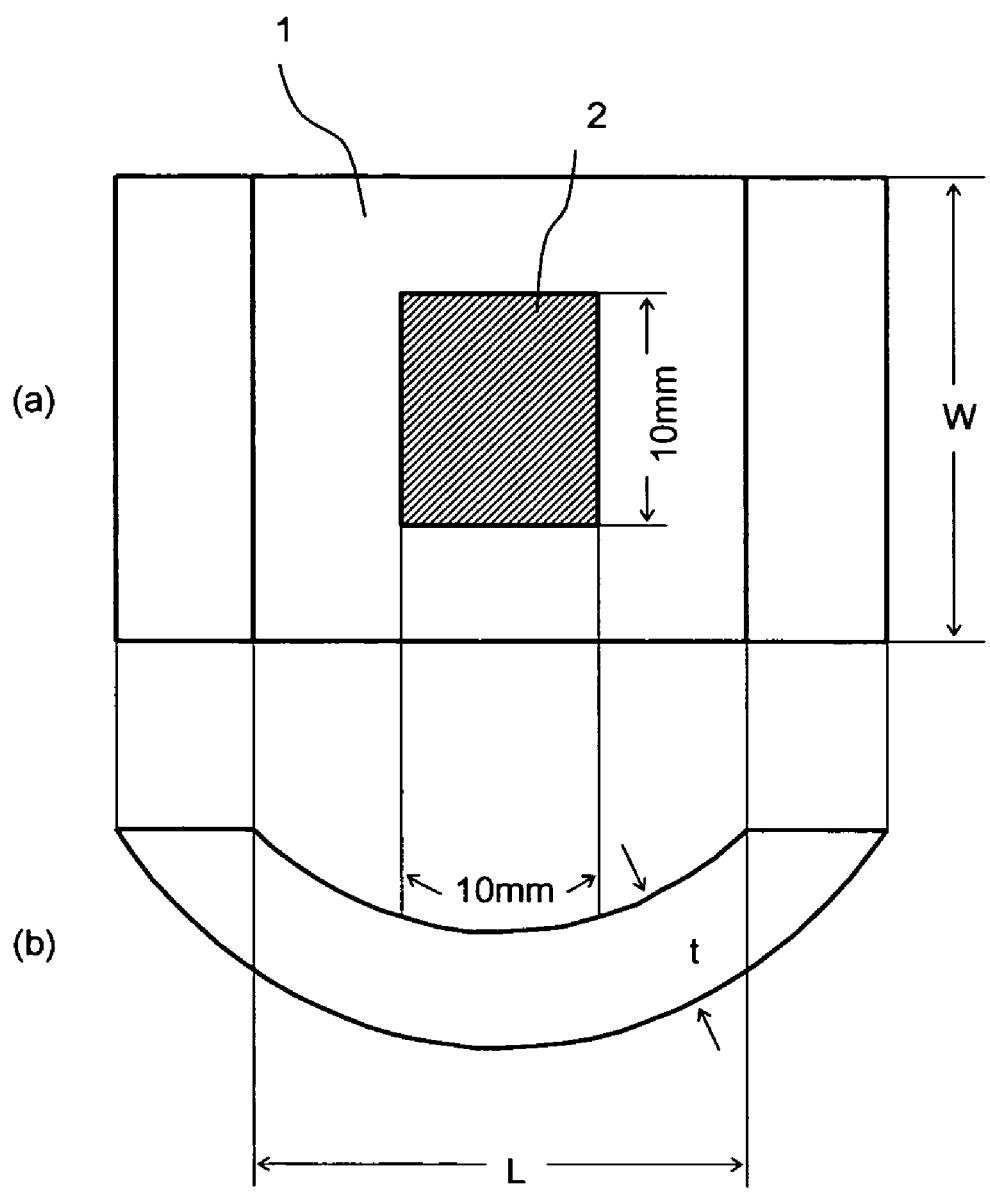
FIG. 1 shows a shape of a test piece used in adhesion test of scale; wherein (a) is a plan view and (b) is a side view.

The present inventor found that the scale on the layer; which has been subjected to shot peening, either exfoliates or does not exfoliate when a thermal shock is applied thereto. The present inventor also has discovered that the above-mentioned difference results from the roughness of the surface of the worked layer. It was confirmed that the scale hardly exfoliates when the surface roughness index is not smaller than a specified value, and the scale is easy to exfoliate if the surface roughness index is smaller than the value.

The thermal shock caused by a sudden temperature drop when the operation stops and the sudden temperature rise during the restart of the operation generates a stress on the interface between the tube material, i.e., base metal, and the scale, or on the interface between inner layer scale and outer layer scale. The stress is apt to cause the exfoliation of scale. This tendency is remarkable when the surface before oxidation is smooth, i.e., the surface roughness index is small.

On a rough surface that is having the roughness index of not smaller than a specified value, the stress generated on the interface between the base metal and the scale is dispersed for every pitch between the peeks and valleys on an irregular profile of roughness and is relatively minimized. Therefore, the exfoliation of scale may be minimum. This effect can also take place on the interface between the inner layer scale and the outer layer scale.

The tube inner surface roughness, which shows the above-mentioned effect, has a roughness having a maximum height of profile (Rz) of 15 μm or more. A preferable maximum height of profile (Rz) is 25 μm or more. The upper limit of the maximum height of profile (Rz) is desirably set to about 80 μm so it does not negatively influence the flow of steam in the inside of the tube. The maximum height of profile (Rz) is defined in the Supplement C of JIS B0601-2001. JIS means Japanese Industrial Standards.

As described above, the exfoliation resistance of scale can be further enhanced by increasing the strain quantity of the inner surface of the worked layer after adjusting the roughness of the inner surface and the grain-refining of the microstructure of the tube material, i.e., base metal.

When the tube's inner surface, which has been subjected to plastic working by the use of steel balls or the like, makes contact with the high-temperature overheated steam, an extremely thin scale of Cr oxides, with a low growth rate, generates uniformly on the inner surface. Since this scale is excellent in oxidation resistance, the subsequent growth and increase of scale can be suppressed. Consequently, the thin scale, excellent in adhesion force, is generated on the inner surface of the tube. The larger the strain quantity of the working layer is, the more remarkable the positive effect.

In the present invention, in order to quantitatively define the strain, an index of ΔHv is used. This index shows the difference in the Vickers hardness between a position 40 μm deep from the inner surface, plastically worked by shot peening or the like, and the center part of the tube thickness. When the tube has a sufficiently hardened working layer in which ΔHv is 100 or more, an extremely excellent steam oxidation resistance takes place. The Vickers hardness means a measured value of Hv 0.1 (test force: 0.9807N) shown in Table 1 of Z 2244 of JIS.

In an austenitic stainless steel, the refining of grains, in other words the formation of a microstructure with ASTM austenite grain size No. 7 or more, is also effective in preventing the generation of scale and further enhances the adhesion force of scale. The refining of grains enables the homogenization of Cr concentration in the tube material (base metal), which prevents the growth of the inner layer scale. The adhesion force of the generated scale can be increased to improve the exfoliation resistance.

To ensure the maximum height of profile (Rz) of 15 μm or more on the tube inner surface, working by shot peening is desirable. Since the maximum height of profile of 15 μm or more is absolutely necessary, the condition of shot peening should be determined so that this purpose can be attained. The shot peening, according to the present invention, is carried out not only for the simply roughing of the surface as in the conventional arts.

It is possible to ensure ΔHv of 100 or more by increasing the blasting pressure or blasting frequency (pass frequency) of the shot peening. The grain refining of the tube material can be attained by a known means such as an adjustment of the tube components (e.g., addition of Nb) or adjustment of the tube producing conditions or heat treatment conditions.

The tubes, according to the present invention, include an alloy steel tube, a ferritic or austenitic stainless steel tube and the like, which are used for boilers. Although there is no special restriction on actual materials thereof, the tube material needs to be a steel containing 9 to 28% by mass of Cr since the scale generated on the inner surface of the tube must be mainly composed of Cr oxides.

Examples of the material for the tube of the present invention include an alloy steel of STBA 26, a ferritic stainless steel such as SUS 410, an austenitic stainless steel such as SUS 304, SUS 309, SUS 310, SUS 316, SUS 321 and SUS 347, which are determined in JIS, and corresponding steels thereof.

Chemical compositions of applicable steels are exemplified below. In the following description "%" for component content means "% by mass".

(1) A ferritic stainless steel containing C: 0.2% or less, Si: 2.0% or less, Mn: 0.1 to 3.0% and Cr: 9 to 28%. This steel may further contain optionally one or more selected from the group consisting of Ni: 0.1 to 1.5%, Mo: 0.1 to 5%, W: 0.1 to 10%, Cu: 0.1 to 5%, N; 0.005 to 0.3%, V: 0.01 to 1.0%, Nb: 0.01 to 1.5%, Ti: 0.01 to 0.5%, Ca: 0.0001 to 0.2%, Mg: 0.0001 to 0.2%, Al: 0.0001 to 0.2%, B: 0.0001 to 0.2% and rare earth elements: 0.0001 to 0.2%.

(2) An austenitic stainless steel containing C: 0.2% or less, Si: 2.0% or less, Mn: 0.1 to 3.0%, Cr: 9 to 28% and Ni: 6 to 50%. This steel may further contain optionally one or more selected from the group consisting of Mo: 0.1 to 5%, W: 0.1 to 10%, Cu: 0.1 to 5%, N: 0.005 to 0.3%, V: 0.01 to 1.0%, Nb: 0.01 to 1.5%, Ti: 0.01 to 0.5%, Ca: 0.0001 to 0.2%, Mg: 0.0001 to 0.2%, Al: 0.0001 to 0.2%, B: 0.0001 to 0.2% and rare earth elements: 0.0001 to 0.2%.

The effect of each component of the above steels and the reason for limiting the content will be described below.

C: Not more than 0.2%

C is an element effective in ensuring tensile strength and creep strength, and it is preferably contained in an amount of 0.01% or more to obtain this effect. However, a content exceeding 0.2% does not contribute to improvement in high-temperature strength but badly affects mechanical properties such as toughness, since carbide that can not solute is left in the steel after solid solution treatment. Accordingly, the content of C is set to 0.2% or less. The content is desirably 0.12% or less for preventing deterioration of hot workability and toughness.

Si: Not more than 2%

Si is an element used as a deoxidizer and effective in improving the steam oxidation resistance, and it is preferably contained in an amount of 0.1% or more. On the other hand, since an excessive amount of Si causes deterioration of weldability and hot workability, the content is set to 2% or less, desirably, 0.8% or less.

Mn: 0.1 to 3.0%

Mn is effective as a deoxidizer similarly to Si, and has the effect of preventing the deterioration of hot workability resulted from S included as an impurity. For improvement in deoxidizing effect and hot workability, Mn is preferably contained in an amount of 0.1% or more. Since an excessively large content causes embrittlement of the steel, the upper limit of the content is set to 3.0%, more preferably 2.0%.

Cr: 9 to 28%

The steel should include Cr in an amount of 9 to 28% since Cr generates a scale mainly composed of Cr oxides on the inner surface of the tube. Cr is a necessary element for ensuring strength, oxidation resistance and corrosion resistance at elevated temperatures. A content of 9% or more is required for sufficient exhibition of the effect. However, since an excessive content causes deterioration of toughness and hot workability of the steel, the upper limit is set to 28%.

Ni: 6 to 50% in austenitic stainless steel; 0.1 to 1.5% in ferritic stainless steel In austenitic stainless steel, Ni is an element necessary for stabilizing an austenite microstructure and improving the creep strength, and a content of 6% or more is required. Further, in order to ensure stability of the microstructure at elevated temperatures for a long time, a content of 15% or more is preferable. However, since the effect saturates even if a large amount of Ni is added, and a content of 50% or more only leads to an increase in cost, the upper limit of the content is set to 50%. The content is preferably 35% or less, more preferably 25% or less.

In ferritic stainless steel, since Ni is effective in improving the toughness, it can be contained inan amount of 0.1% or more optionally. A content exceeding 1.5% causes deterioration of creep rupture strength.

Mo: 0.1 to 5%, W: 0.1 to 10%, Cu: 0.1 to 5%

Mo, W and Cu are preferably included since they enhance the high-temperature strength of the steel. The effect can be exhibited by including at least one of them in an amount of 0.1% or more. Since too much content impairs the weldability and workability, the upper limit is set to 5% for Mo and Cu, and to 10% for W.

N: 0.005 to 0.3%

N contributes to solid-solution strengthening of the steel. Further, N is fixed with another element and effectively strengthens the steel by a precipitation strengthening effect. In order to obtain the effects, a content of 0.005% or more is required. However, a content exceeding 0.3% may cause deterioration of ductility and weldability of the steel.

V: 0.01 to 1.0%, Nb: 0.01 to 1.5%,Ti: 0.01 to 0.5%

Each of V, Nb and Ti combines with carbon and nitrogen to form carbonitrides and contributes to precipitation strengthening. Accordingly, one or more of them are preferably contained in an amount of 0.01% or more. Since an excessively large content impairs the workability of steel, the upper limit of content is set to 1.0% for V, 1.5% for Nb, and 0.5% for Ti.

Ca: 0.0001 to 0.2%, Mg: 0.0001 to 0.2%, Al: 0.0001 to 0.2%, B: 0.0001 to 0.2%, Rare earth elements: 0.0001 to 0.2%

Each of Ca, Mg, Al, B and rare earth elements, namely La, Ce, Y, Pd, Nd etc. is effective in improving the strength, workability, and steam oxidation resistance. In order to obtain these effects, one or more of them may be contained in an amount of 0.0001% or more, respectively. When each content of these elements exceeds 0.2%, the workability and weldability are impaired.

EXAMPLE

Steel tubes having chemical compositions shown in Table 1 were treated with thermal treatment conditions and working conditions shown in Table 2 in order to adjust grain sizes. The "cold working" of tubes A-2 and B-2 in Table 2 means cold working for forming in the tube making process. The exfoliation resistance of scale was examined by using the resulting steel tubes. The test conditions were as follows.

(1) Size of Tube

Outside diameter: 50.8 mm, thickness: 8.0 mm (2) Working of Surface

The inner surfaces of the tubes were subjected to shot peening under the conditions below.

Shot: Martensite steel balls (average ball size: 600 μm)

Blasting quantity of shot: about 10 kg/min (shown in Table 3)

Blasting pressure: described in Table 3. Pressure of 58.8 N/cm² or more was adapted in order to enhance the hardness of the working layer.

Blasting frequency:

As described in Table 3, the surface roughness was adjusted by varying the blasting frequency (pass frequency). In the table, "one pass" means that peening is carried out in the above condition from one end of the tube to the other end while moving a shot injection nozzle inserted into the tube at 250 mm/min.

(3) Measurement of Grain Size and Hardness Test pieces were taken from the tubes before shot peening, and the respective cross sections in the thickness direction were microscopically observed in order to measure the grain sizes. Respective Vickers hardness at Hv 0.1 (test force: 0.9807N) was measured at a position 40 μm deep from the surface of each test piece after shot peening, and at the center of thickness thereof, in order to determine the difference (ΔHv) between them.

(4) Test of Adhesion Force of Scale

A test piece 1 of a shape shown in FIG. 1 was taken from each tube after shot peening. In FIG. 1, L is 25 mm, w is 20 mm and t is 5 mm. The shadowed portion 2 in the test piece 1 is a part for adhering a jig 3 shown in FIG. 2.

Figure 2:
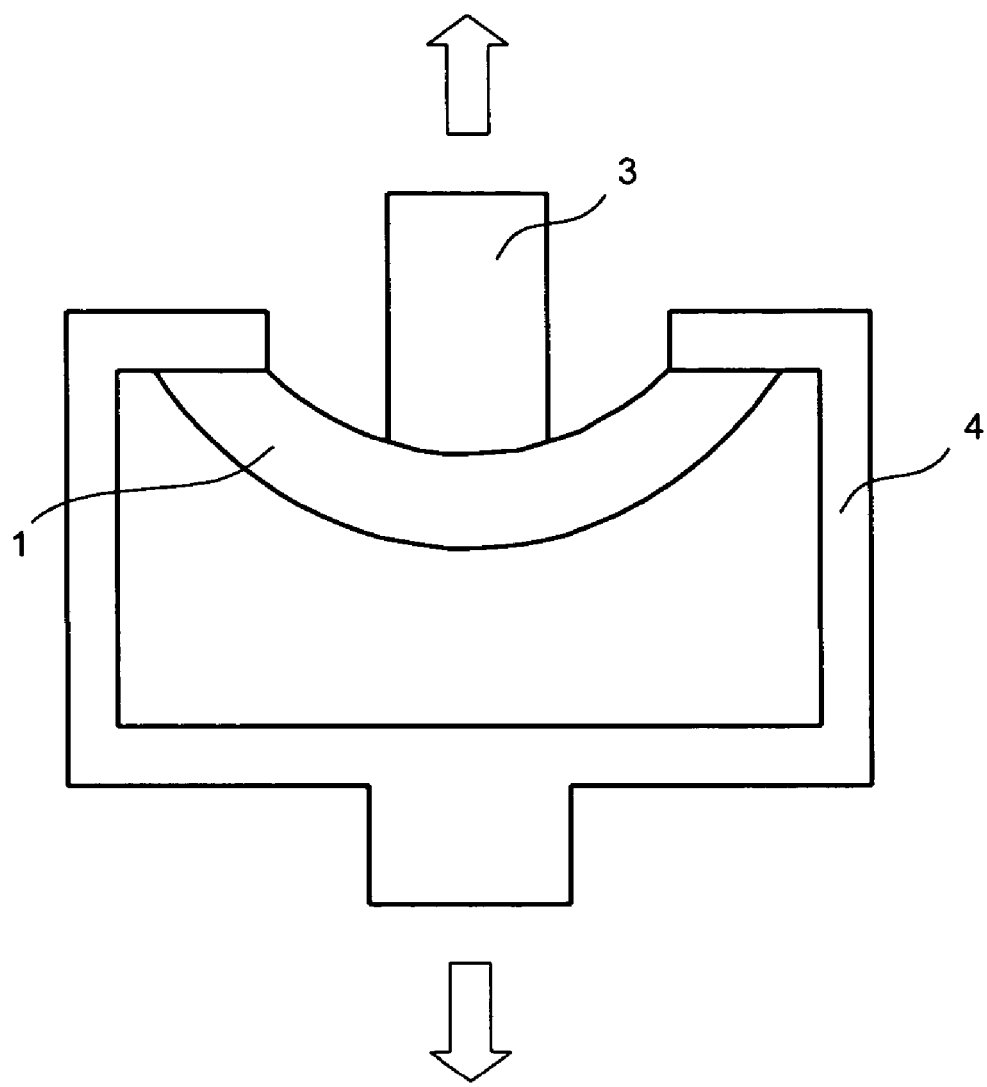
FIG. 2 shows a procedure of measuring adhesion force of scale.

The above-mentioned test piece was exposed to steam atmosphere at 650° C. for 10,000 hours in order to grow the scale. The jig 3 was adhered to the side corresponding to the tube inner surface of the test piece as shown in FIG. 2, both ends were set to a jig 4, and a tensile force was applied in the arrowed direction to measure the force for exfoliating the scale. The measured value was taken as adhesion force. The adhesive used for the adhesion of the jig 3 is Araldite (trademark) manufactured by Huntsman Advanced Materials Ltd.

The test results are shown in Table 3.

Table 1

TABLE 1

| Steel | Typical Composition (mass %, bal.: Fe and impurities) | | | | | | | |
|---|---|---|---|---|---|---|---|---|
| | C | Si | Mn | Cr | Ni | Nb | Cu | N |
| A | 0.08 | 0.6 | 1.6 | 18.0 | 10.0 | 0.8 | — | — |
| B | 0.10 | 0.2 | 0.8 | 18.0 | 9.0 | 0.5 | 3 | 0.1 |
| C | 0.06 | 0.4 | 1.2 | 25.0 | 20.0 | 0.45 | — | 0.2 |

Table 2

TABLE 2

| Tube | Conditions of Heat Treatment and Working | ASTM Grain Size No. |
|---|---|---|
| A-1 | 1200° C. × 2 min → Shot Peening | 5.1 |
| A-2 | 1250° C. × 2 min → Cold Working → 1180 × 2 min → Shot Peening | 9.2 |
| B-1 | 1200° C. × 2 min → Shot Peening | 5.2 |
| B-2 | 1250° C. × 2 min → Cold Working → 1180 × 2 min → Shot Peening | 8.9 |
| C | 1200° C. × 2 min → Shot Peening | 5.8 |

Note:
Tube A-1 corresponds to SA213-TP347H.
TubeA-2 corresponds to SA213-TP347HFG.
Tubes B-1 and B-2 correspond to ASME Code 2328-1.
Tube C corresponds to SA213-TP310HCbN Table 3

TABLE 3

| Test Piece No. | Category | Tube in Table 2 | Shot Peening | | | Maximum Height of Profile, Rz(μm) | Δ Hv | ASTM Grain Size No. | Adhesion Force of Scale (MPa) |
|---|---|---|---|---|---|---|---|---|---|
| | | | Blasting Frequency | Quantity (kg/min) | Pressure (N/cm²) | | | | |
| 1 | Comparative | A-1 | 1 | 10.1 | 49.0 | 8 | 60 | 5.1 | 6.9 |
| 2 | Example | A-1 | 2 | 9.8 | 50.0 | 12 | 85 | 5.1 | 7.8 |
| 3 | Example of | A-1 | 3 | 10.2 | 50.0 | 18 | 92 | 5.1 | 9.8 |
| 4 | the Invention | A-1 | 4 | 10.1 | 49.0 | 25 | 98 | 5.1 | 10.8 |
| 5 | | A-1 | 4 | 10.5 | 69.6 | 27 | 185 | 5.1 | 11.8 |
| 6 | | A-2 | 3 | 9.9 | 49.0 | 27 | 91 | 9.2 | 13.7 |
| 7 | | A-2 | 4 | 10.0 | 50.0 | 26 | 141 | 9.2 | 14.1 |

TABLE 3-continued

| Test Piece No. | Category | Tube in Table 2 | Shot Peening Blasting Frequency | Quantity (kg/min) | Pressure (N/cm²) | Maximum Height of Profile, Rz(μm) | Δ Hv | ASTM Grain Size No. | Adhesion Force of Scale (MPa) |
|---|---|---|---|---|---|---|---|---|---|
| 8 | | A-2 | 4 | 10.3 | 68.6 | 27 | 182 | 9.2 | 14.7 |
| 9 | Comparative | B-1 | 1 | 9.9 | 49.0 | 9 | 68 | 5.2 | 6.9 |
| 10 | Example | B-1 | 2 | 10.1 | 50.0 | 13 | 90 | 5.2 | 7.8 |
| 11 | Example of | B-1 | 3 | 10.2 | 49.0 | 17 | 92 | 5.2 | 9.8 |
| 12 | the Invention | B-1 | 4 | 10.3 | 70.6 | 28 | 178 | 5.2 | 11.8 |
| 13 | | B-2 | 3 | 10.0 | 49.0 | 18 | 93 | 8.9 | 13.7 |
| 14 | | B-2 | 4 | 10.2 | 68.6 | 26 | 144 | 8.9 | 14.4 |
| 15 | | B-2 | 4 | 10.5 | 70.6 | 28 | 186 | 8.9 | 14.7 |
| 16 | Comparative | C | 1 | 9.7 | 49.0 | 8 | 58 | 5.8 | 7.8 |
| 17 | Example | C | 2 | 9.9 | 51.0 | 14 | 95 | 5.8 | 7.8 |
| 18 | Example of | C | 3 | 10.2 | 50.0 | 19 | 96 | 5.8 | 13.9 |
| 19 | the Invention | C | 4 | 10.1 | 49.0 | 27 | 139 | 5.8 | 14.0 |
| 20 | | C | 4 | 10.3 | 70.6 | 31 | 191 | 5.8 | 15.7 |

As is apparent from Table 3, an adhesion force of 9.8 MPa or more can be obtained with 15 μm or more of the maximum height of profile of the surface. When the adhesion force is smaller than 9.8 MPa, the scale is apt to exfoliate by the thermal shock, which is caused by the stop and restart of the operation of the boiler because of the insufficient adhesive property. However, each of the inventive examples has sufficient adhesion property.

The test pieces Nos. 5, 12, 19 and 20 have a higher scale adhesion force with ΔHv of 100 or more. The same can be said for the test pieces Nos. 6 and 13, which have fine grain microstructures of grain size No. 7 or more. Further, extremely high scale adhesion force can be obtained in those having both ΔHv of 100 or more and grain size No. 7 or more.

In the shot peening condition of this example, a predetermined surface roughness cannot be obtained with a pass frequency of 1 or 2. According to the shot peening by only one pass as in the conventional arts, portions insufficiently hit by steel balls are left on the tube's inner surface during the shot peening, and the objective of the present invention cannot be attained due to a surface roughness smaller than the specified value. To ensure the surface roughness of the specified value or more, it is necessary to carry out the shot peening two or more times.

INDUSTRIAL APPLICABILITY

The steel tube, according to the present invention, has extreme excellence in exfoliation resistance of scale on the inner surface. This steel tube is suitable for use as a boiler tube, which suffers steam oxidation or the like. Since the scale hardly exfoliates by thermal stress caused by repeated heating and cooling, an accident, such as an obstruction in the tube, can be remarkably minimized.

The invention claimed is:

1. An austenitic stainless steel tube excellent in exfoliation resistance of scale on its inner surface,
    containing 9 to 28% by mass of Cr, and
    having a maximum height profile (Rz) on the inner surface after cold working of 15 μm or more, and further ΔHv of 100 or more,
    wherein the ΔHv is the difference in Vickers hardness between at the inner surface layer and at the thickness center part of the tube.

2. An austenitic stainless steel tube excellent in exfoliation resistance of scale on its inner surface,
    containing 9 to 28% a by mass of Cr, and
    having a maximum height profile (Rz) on the inner surface after cold working of 15 μm or more,
    wherein a base metal of the austenitic stainless steel tube has a microstructure of ASTM austenite grain size No. 7 or more.

3. The austenitic stainless steel tube excellent in exfoliation resistance of scale on its inner surface according to claim 1,
    wherein a base metal of the austenitic stainless steel tube has a microstructure of ASTM austenite grain size No. 7 or more.

* * * * *